No. 742,352. PATENTED OCT. 27, 1903.
W. W. PRICE.
PIPE COUPLING.
APPLICATION FILED NOV. 28, 1902.
NO MODEL. 2 SHEETS—SHEET 1.

WITNESSES. INVENTOR
Matthew Siebler. W. W. Price,
Carolyn M. Theobald. By R. J. McCarty,
his ATTORNEY

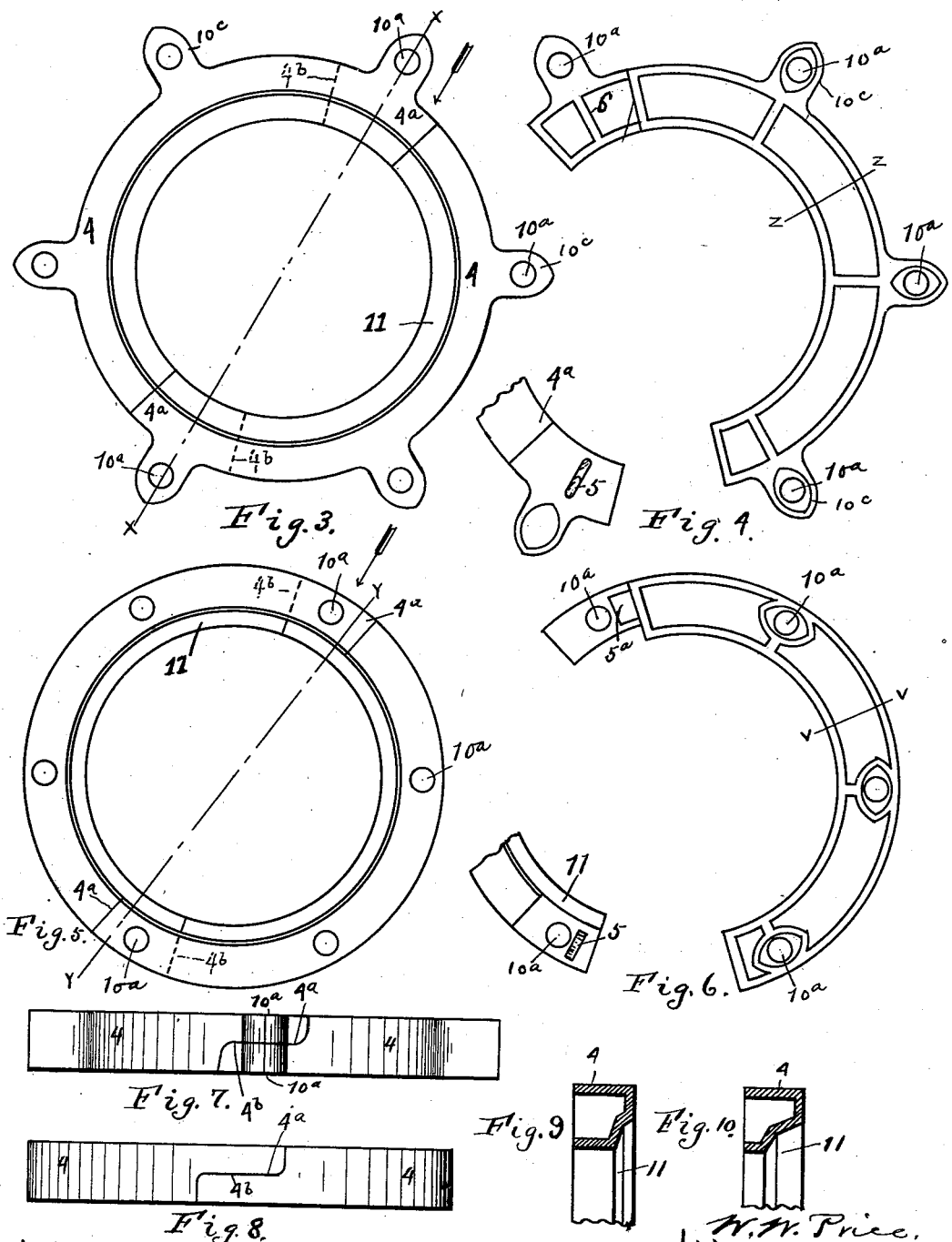

No. 742,352. Patented October 27, 1903.

UNITED STATES PATENT OFFICE.

WILLIAM W. PRICE, OF DAYTON, OHIO.

PIPE-COUPLING.

SPECIFICATION forming part of Letters Patent No. 742,352, dated October 27, 1903.

Application filed November 28, 1902. Serial No. 133,042. (No model.)

*To all whom it may concern:*

Be it known that I, WILLIAM W. PRICE, a citizen of the United States, residing at Dayton, in the county of Montgomery and State of Ohio, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in pipe-clamps; and it consists in the novel features hereinafter described and claimed.

The object of the invention is to provide a clamp for stopping leaks at pipe-joints, whether screwed or leaded joints.

Preceding a detail description of my invention reference is made to the accompanying drawings, of which—

Figure 1:
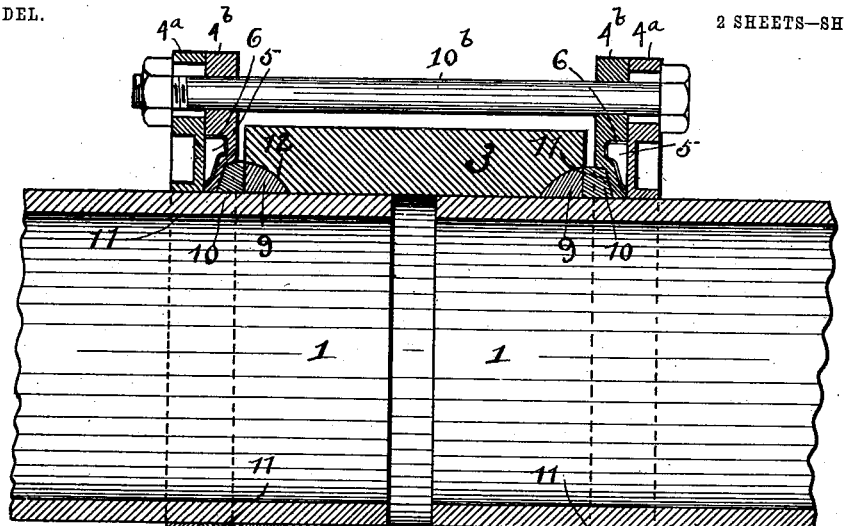
Figure 2:
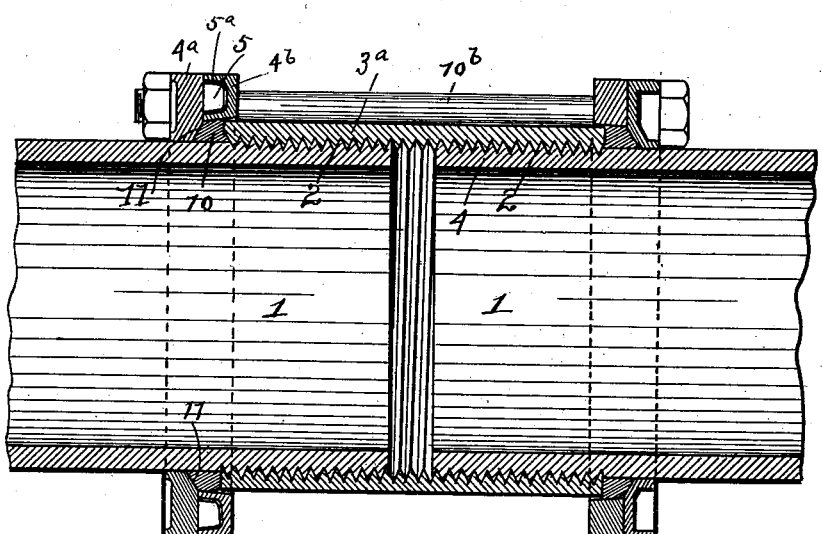

Figure 1 is a mid-sectional elevation of my improved pipe-clamp, showing the same in position on a leaded joint. Fig. 2 is a view similar to Fig. 1 of a modification of the clamp, showing the same as applied to a screw-joined pipe. Figs. 3 and 4 are end elevations of opposite sides of the clamp as shown in Fig. 1. Figs. 5 and 6 are end elevations of opposite sides of the clamp-flange as shown in Fig. 2. Fig. 7 is an edge view of the clamp looking in the direction of the arrow in Fig. 3. Fig. 8 is an edge view of the clamp looking in the direction of the arrow in Fig. 5. Fig. 9 is a cross-sectional view of one member of the clamp on the line $z\,z$ of Fig. 4. Fig. 10 is a sectional view of a portion of one member of the clamp on the line $v\,v$ of Fig. 6.

In a detail description of my invention similar reference characters indicate corresponding parts.

Referring to Figs. 1, 3, and 4, 1 1 designate two adjacent pipe ends which are inclosed by a sleeve 3 of a substantial thickness to provide suitable strength, and a seat 12 for lead-packing gland 9, which lies at each end of said sleeve in suitable annular seats or pockets. 4 4 designate two semicircular sections which when united constitute flanges which surround the pipe-sections 1 1 at the ends of the sleeve 3 and are united and drawn toward the ends of the sleeve 3 by means of bolts $10^b$, which pass through openings $10^a$, arranged at suitable points around the flanges. The inner face of each of said flanges is provided with a seat having tapering surfaces 11, in which is placed a suitable rubber or elastic packing 10, that joins the lead gasket 9 when the flanges are tightened by means of bolts $10^b$. (See Figs. 9 and 10 for the tapering surfaces 11.) The ends of the two sections 4 4 of said flanges are reduced in thickness to provide two overlapping ends $4^a$ and $4^b$, which when the two sections are placed together constitute a continuous clamping-ring of uniform thickness, as shown in Figs. 1 and 3. The overlapping ends of one section are provided with a locking-lug 5 and a recess the reverse of those on the ends of the other section. The lugs 5 are tapered, as shown in Fig. 1, and enter similarly-shaped recesses or cavities 6 in an overlapping end of the other section, so that the said lugs on the end of one section and the recess in the end of the other section constitute male and female connections between the two sections of the clamp. When the two sections are placed in position as shown in Figs. 1 and 7, the bolt-holes $10^a$ in the ends of one section are immediately above and below the bolt-holes $10^a$ in the ends of the other section, so that bolts $10^b$ passing through said openings unite the two sections of the flange at their ends, as shown in Fig. 1.

Referring to the modification of the clamp shown in Figs. 2, 5, 6, and 8, the bolt-holes $10^a$ are in the body of the flange, while in Figs. 1, 3, 4, and 7 the said bolt-holes $10^a$ are in outwardly-extended portions $10^c$. This variation is due to the fact that the sleeve 3 must of necessity be considerably thicker than the sleeve $3^a$, as shown in Fig. 2, in order to provide a suitable seat for the lead gasket 9. It will be observed that the sleeve $3^a$ is not provided with the packing-seat 12. Therefore it may be considerably thinner than the sleeve 3, thus permitting the bolt-holes $10^a$ to be arranged in the body of the flange, as shown in Figs. 5 and 6. The sleeve $3^a$ is provided with interior screw-threads, which engage with exterior screw-threads 2 on the ends of the pipes 1 1. The flanges made up of the two sections 4 4 are substantially the same with the exception that the locking-lugs 5 and the locking-recesses 5ᵃ in the overlapping ends 4ᵃ and 4ᵇ are of different shape as compared with the lugs 5 and the recesses 6, as shown in Fig. 1. This is owing to the fact that the packing-seat 11, as shown in Figs. 3 and 9, is not as deep as that shown in Figs. 5 and 10. Consequently the bottom of the recesses 5ᵃ in which the lugs 5 project is straight, while the bottom of the recesses 6 in which the lugs 5 project, as well as the lugs themselves, are irregular or uneven, as shown in Fig. 5. The lead gasket, as shown in Fig. 1, is not a feature of the modification, as will be apparent from Fig. 2. The angles of the seats 11 are a very important feature, for the reason that the packing 10 is forced in the direction of the pipe 1 as well as in the direction of the ends of the sleeves. In other words, there are two different lines of force exerted on the packing—namely, inwardly and horizontally—the effect of which is to obtain a better joint with less strain upon the bolts, and the less pressure put upon the packing the greater will be the lasting qualities thereof. In other words, the elasticity will be preserved for a long time.

Having described my invention, I claim—

A pipe-clamp composed of two ring-segments, the ends of which overlap and are provided with recesses and projections which provide temporary locking means so that any two segments will form a complete ring, an annular packing-seat in said ring, the walls of which taper outwardly to their meeting-points and provide inclined surfaces 11 which direct an inward and a horizontal pressure upon the packing placed therein, a packing-gland 10 placed in said seat, a coupling-sleeve inclosing two abutting ends of pipe-sections and lying between two of said clamps, said sleeve having annular tapering seats 12 in its ends, a metallic gasket 9 placed in said seats and abutting with the packing 10 in the clamp, and means for rigidly uniting said clamp.

In testimony whereof I affix my signature in presence of two witnesses.

WILLIAM W. PRICE.

Witnesses:
R. J. McCARTY,
CAROLYN M. THEOBALD.